P. Prescott,
Revolving Rake.
No. 82,749.
Patented Oct. 6, 1868
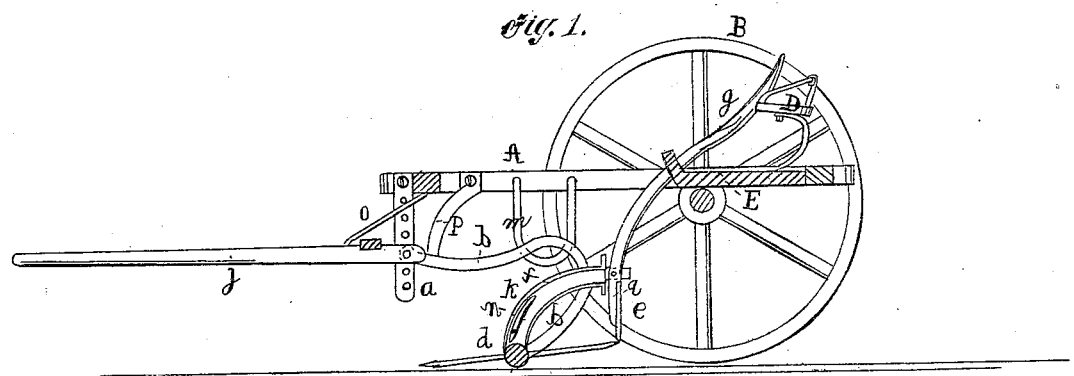
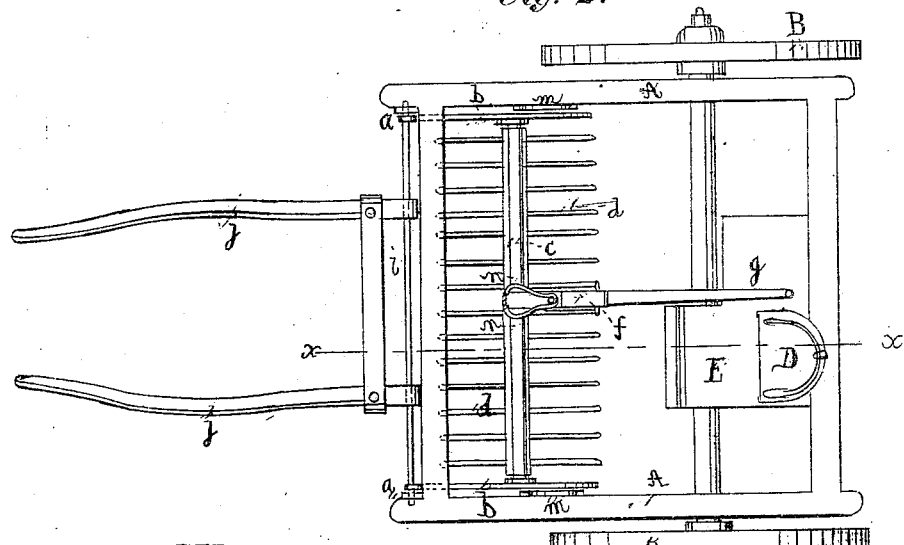
Witnesses:
Wm A. Morgan
G. C. Cotton
Inventor:
Peter Prescott
per
Attorneys

United States Patent Office.

PETER PRESCOTT, OF BOONEVILLE, NEW YORK, ASSIGNOR TO ISAAC HALL, WILLIAM J. HALL, AND C. M. PRESCOTT, OF SAME PLACE.

Letters Patent No. 82,749, dated October 6, 1868.

IMPROVEMENT IN HORSE HAY-RAKES.

The Schedule referred to in these Letters Patent and making part of the same.

TO ALL WHOM IT MAY CONCERN:

Be it known that I, PETER PRESCOTT, of Booneville, in the county of Oneida, and State of New York, have invented a new and useful Improvement in Horse Hay-Rakes; and I do hereby declare that the following is a full, clear, and exact description thereof, which will enable others skilled in the art to make and use the same, reference being had to the accompanying drawing, forming part of this specification, in which—

Figure 1 is a sectional elevation of my invention, the section being taken through the line $x\ x$, fig. 2.

Figure 2 is a plan view of the invention.

Similar letters of reference indicate like parts.

The object of this invention is to provide a horse hay-rake which is conveniently operated, and which is almost if not entirely free from the objectionable downward pressure of the shafts upon the horse drawing the same. Other devices perfecting the whole, render my invention of light draught and effective in operation.

It consists in attaching the rake-shaft $c$ to curved arms $b$, the forward ends of which latter are hinged on a cross-rod, $i$.

The shafts $j\ j$ are attached to this rod, and braced by iron brace-rods.

The ends of the rod $i$ are inserted in the vertical plates $a\ a$, which are affixed to the frame A of the rake and project downward. Several holes are formed in the plates $a\ a$, for the purpose of adjusting the position of the shafts higher or lower, to bring the point of application of the draught-force as low down as possible, and level with the point of attachment of the vibrating arms $b\ b$, whereby the weight of the hay gathered upon the rake-teeth $d\ d$ will not, in connection with the draught-strain, tend, in so great a degree, to bear the shafts $j\ j$ down upon the horse's neck and shoulders.

The plates $a\ a$ are stiffened by braces $p$.

$m\ m$ are guides for the arms $b$, which latter swing upward when the rake is revolved, to discharge the hay gathered thereon.

The tripping-lever $g$ is pivoted to the curved arm $f$, which latter is connected with the shaft $c$ by a metal loop-strap, $k$, passing around the said shaft. Beneath the strap $k$ are affixed two spring-catches $n\ n$, which, from their shape and arrangement, will be compressed together by the two adjacent rake-teeth, which encounter them as the shaft revolves. The shoulder formed by the lower parts of the springs returning abruptly, encounters the said adjacent teeth, thus preventing the rake from being revolved backward.

The foot-plate $e$ of the trip-lever rests against the ends of the two middle teeth, thus preventing the rake from discharging the gathered hay until actuated to do so by lifting the lever, the handle of which latter is conveniently accessible to the driver upon the seat D.

The amount of vibration permitted to the lever for disengaging the foot-plate from the rake-teeth is adjusted by a set-screw, $q$.

The foot-board E rests partially upon the axle of the draught-wheels B B.

Having thus described my invention, I claim as new, and desire to secure by Letters Patent—

The plates $a\ a$, rods $i$, arms $b\ b$, arranged substantially as described, for the purpose of lessening the pressure of the shafts or tongue of a revolving horse-rake, all as set forth.

PETER PRESCOTT.

Witnesses:
CALVIN V. GRAVES,
L. W. BOWDISH.